B. ANDREWS,

Assignor to J. H. SESSIONS.

TRUNK FASTENER.

No. 10,089. Reissued Apr. 25, 1882.

Witnesses.
John Edwards Jr.
Lucas C. Clark

Inventor
Benjamin Andrews
By James Shepard
atty

N. PETERS. Photo-Lithographer, Washington, D. C.

UNITED STATES PATENT OFFICE.

BENJAMIN ANDREWS, OF PHILADELPHIA, PENNSYLVANIA, ASSIGNOR TO J. H. SESSIONS, OF BRISTOL, CONNECTICUT.

TRUNK-FASTENER.

SPECIFICATION forming part of Reissued Letters Patent No. 10,089, dated April 25, 1882.

Original No. 127,010, dated May 21, 1872. Application for reissue filed November 12, 1881.

*To all whom it may concern:*

Be it known that I, BENJAMIN ANDREWS, of the city and county of Philadelphia, and State of Pennsylvania, have invented certain new and useful Improvements in Trunk-Fasteners; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1:
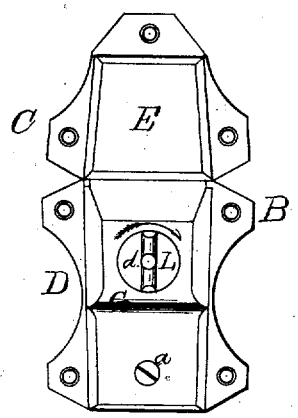
Figure 2:
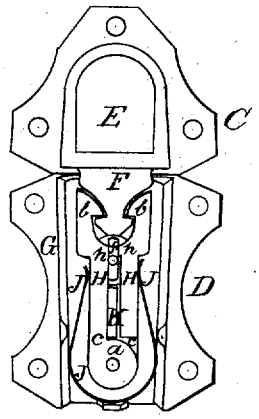
Figure 3:
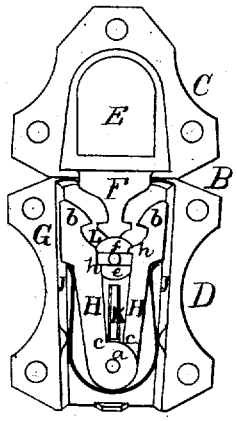
Figure 4:
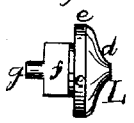
Figure 5:
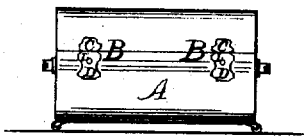

Figure 1 is a front view of the device detached from the trunk, illustrating my invention. Figs. 2 and 3 are inside views thereof. Fig. 4 is a detached view of the rotating cam-shaft, and Fig. 5 is a front view of a trunk having my fasteners applied thereto.

Similar letters of reference indicate corresponding parts in the several figures.

This invention relates to fastenings for trunks, independent of the locks, and is designed as a substitute for the ordinary straps and buckles.

It consists in the construction of a rotating cam-shaft for releasing the hold which the dogs may have upon the catch, and to keep the dogs out of engagement with the catch so long as may be desired.

It also consists in the construction of the dogs, so as to limit the rotation of the cam-shaft in releasing their hold upon the catch.

It also consists in the construction and combination of various parts.

Referring to the drawings, A represents a trunk, which may be of ordinary form and construction. B represents the fastenings applied thereto. These fastenings are independent of the lock or locks of the trunk, and consist of the part C, which is to be secured to the lid of the trunk, and the part D, to be secured to the body thereof, or vice versa. (See Fig. 5.) The part C is constructed of a head, E, formed with or having secured to it a catch, F, which is somewhat of the form of a double hook. The part D is constructed of a casing, G, within which are mounted, by means of an axis, *a*, two swinging dogs, H, having noses *b*, which are hooked and designed to engage with or embrace the catch F. The upper faces of the noses are beveled or sloped, so that when the lower end of the catch strikes said faces it forces the dogs apart, and by the further descent of the catch permits the latter to engage with the hooks of the noses *b*. The dogs will be forced toward the catch by means of one or more springs, J, properly arranged, so that when the catch is in the part D the dogs are held against the catch, and thus the trunk is fastened. Owing to the great strain that will naturally occur on the axis *a* the latter may be weakened or caused to wear severely. A vertical rib, K, will be formed with or secured to the inner face of the casing G, so that the portions *c* of the dogs just above the axis will bear against the rib and the latter take up the strain and relieve the axis. Within the casing G is fitted a rotating cam-shaft, L, which is constructed of a finger-piece, *d*, for operating said shaft from the outside of the casing, a bearing-piece, *e*, which rotates in an opening formed in the contiguous portion of the casing G, and a cam, *f*, upon the inside of the casing, which is designed to come in contact with the inner faces of the dogs H for opening the latter. The cam-shaft may be retained in place by means of a pivot, *g*, which passes into a metal plate by the side of the dogs, and is headed so as to prevent the withdrawal or displacement of the cam-shaft L.

When the lid of the trunk is closed or forced down the catch F is pressed against the nose of the dogs and engages with them. The cam *f* of the cam-shaft then lies in a vertical position, as shown in Fig. 2. When it is desired to raise the lid the cam-shaft L is turned by means of its operating-handle or finger-piece *d*, and this causes the cam to lie in a horizontal position, as shown in Fig. 3. In this movement the dogs are forced away from the catch F and their hold thereon is released. The rotary movement of the cam is stopped when it lies in a horizontal position, as shown in Fig. 3, in which position the pressure of the spring-actuated dogs will have no substantial tendency to rotate said cam, whereby said cam not only releases the fastening but holds the same unfastened, so that after one of these fastenings is released by the use of one hand it will be held released by said cam until the other fastening can be released by using the same hand, and the lid elevated, thus rendering it necessary to attend to only one of the fastenings B B at a time. The cam-shafts should then be turned to permit the dogs to be thrown into their normal position by means of the spring or springs, ready for the subsequent operation of fastening.

In order to cause the cam *f* of the cam-shaft L to cease rotation when the dogs are fully opened —that is, when the cam is horizontal—the portions of the inner faces of the dogs over which the bar rides terminate in shoulders *h*, respectively facing upward and downward, so that the ends of the bar will come to a bearing against the shoulders, and thereby prevent the bar from further rotation in the direction necessary to open the dogs. These shoulders also prevent the accidental rotation of the cam, otherwise resulting from the pressure of the spring against the dogs, and serve to cause the cam-shaft to be always operated for opening the dogs in the same direction, as indicated by the arrow in Fig. 1. The lower end of the head E will bear against the top of the part D and the sides of the catch fit snugly in the opening which it enters in the upper end of the casing G, so that the parts C D will hold firmly together, and any lateral strain or shaking that might occur between the lid of the trunk and its body is prevented from reaching the hasp or mechanism of the lock, whereby the fastening thus serves to protect the lock.

It should be observed that the finger-piece herein shown and described differs from the ordinary lock-key—first, because it is not detachable, but is always in place and accessible, so that the fastener cannot furnish security against an unauthorized onening of the trunk, and therefore the fastener is in no sense a lock or any equivalent therefor; second, because the finger-piece is made to project but very slightly from the case, and is constructed with special reference to its safety during transportation of the trunk, so that it will not be liable to be lost, broken, or injured, or to be the means of injuring other parts of the fastener by being caught by or catching upon other objects.

Having thus described my invention, what I claim as new, and desire to secure by Letters Patent, is—

1. In a trunk-fastener, the rotating cam-shaft, constructed as described, and operating in combination with the dogs H and catch F, substantially as described.

2. In a trunk-fastener, the dogs having the shoulders *h*, in combination with the cam *f* of the rotating cam-shaft L, acting upon said shoulders to limit the rotation of said shaft, substantially as described, and for the purpose specified.

3. In a trunk-fastener, the combination of the dogs having shoulders *h*, the casing G, having the rib K, the rotating cam-shaft L, having cam *f*, and the catch F, all operating substantially as described, and for the purpose specified.

BENJAMIN ANDREWS.

Witnesses:
J. H. SESSIONS, Jr.,
THOS. M. LONGCOPE.